United States Patent
Flataker et al.

(10) Patent No.: US 7,455,576 B1
(45) Date of Patent: Nov. 25, 2008

(54) OYSTER SPLITTING DEVICE AND METHOD OF USE

(76) Inventors: Oddmund A. Flataker, P.O. Box 1128, Hoodsport, WA (US) 98548; Marylou F. Flataker, P.O. Box 1128, Hoodsport, WA (US) 98548

(*) Notice: Subject to any disclaimer, the term of this patent is extended or adjusted under 35 U.S.C. 154(b) by 0 days.

(21) Appl. No.: 11/799,819

(22) Filed: May 3, 2007

(51) Int. Cl.
*A22C 29/02* (2006.01)
(52) U.S. Cl. ......................................................... 452/16
(58) Field of Classification Search ................ 452/1–13, 452/16, 17; 30/120.1–120.5
See application file for complete search history.

(56) References Cited

U.S. PATENT DOCUMENTS

| | | | |
|---|---|---|---|
| 2,609,565 A | | 9/1952 | Mostowicz |
| 3,151,352 A | * | 10/1964 | Hagen et al. .................. 452/16 |
| 3,496,975 A | * | 2/1970 | Hill ............................ 30/120.2 |
| 4,087,910 A | * | 5/1978 | Doyel ........................ 30/120.5 |
| 4,133,078 A | | 1/1979 | Cromwell |
| 4,393,546 A | | 7/1983 | Ruiz |
| 4,796,333 A | * | 1/1989 | Stinson et al. ................. 452/16 |
| 4,874,155 A | | 10/1989 | Goul |
| 5,022,137 A | | 6/1991 | Sorensen et al. |
| D320,919 S | | 10/1991 | Sorensen |
| 5,288,263 A | * | 2/1994 | Ayala .......................... 452/16 |
| 5,482,500 A | * | 1/1996 | Boettner et al. ............... 452/16 |
| 5,599,228 A | | 2/1997 | Thibault |
| 5,669,275 A | * | 9/1997 | Mills ............................. 82/47 |
| 5,853,168 A | | 12/1998 | Drake |
| 6,929,253 B2 | | 8/2005 | Marks |

* cited by examiner

*Primary Examiner*—Thomas Price

(57) ABSTRACT

Oyster splitting devices split open oysters and clams. A bar clamp has a drawbar slidably inserted through a grip. The drawbar has a stop on one end and a jaw on its other end. The grip has a jaw trigger and a bar release trigger pivotably attached to it. A spike is attached to the grip with the spike's pointed end facing the jaw. An oyster's open end is placed against the jaw. When the jaw trigger is pulled by the user, the jaw urges the hinged end of the oyster against the spike, splitting its shells apart. The drawbar's opposing end opposite the jaw may be tempered and tapered and used to pry oysters from rocks and/or remove meat from split oysters. A safety cover connected to the grip by a lanyard removably covers the opposing end of the drawbar opposite the jaw when it is not in use.

3 Claims, 4 Drawing Sheets

OYSTER SPLITTING DEVICE AND METHOD OF USE

BACKGROUND OF THE INVENTION

1. Field of the Invention

The present invention relates to an oyster splitting device for use in connection with opening bivalves. The oyster splitting device has particular utility in connection with splitting open oysters and clams.

2. Description of the Prior Art

Oyster splitting devices are desirable for splitting open oysters and clams. Many people enjoy shell fishing and eating oysters and clams. However, the traditional method of opening bivalves consists of prying the shells apart with an oyster knife. Unfortunately, it is easy for the knife to slip and injure the user. Tools for holding bivalves and opening them are known, but none of these devices is spring-loaded, resulting in the user having to exert significant effort. Spring-loaded clamps are known, but they lack implements to open mollusks.

The use of bivalve openers is known in the prior art. For example, U.S. Pat. No. 4,133,078 to Cromwell discloses a bivalve opener. However, the Cromwell '078 patent does not have a bar clamp, and has further drawbacks of lacking a spring-loaded trigger.

U.S. Pat. No. 5,599,228 to Thibault discloses a clamp for holding oysters and like mollusc while being pried opened that safely opens oysters and other mollusks. However, the Thibault '228 patent does not have a spike, and additionally does not have a bar clamp.

Similarly, U.S. Pat. No. 2,609,565 to Mostowicz discloses a device for splitting clams that splits clams. However, the Mostowicz '565 patent does not have a bar clamp, and does not have a spring-loaded trigger.

In addition, U.S. Pat. No. 4,393,546 to Ruiz discloses an oyster splitter that splits the shells of oysters and clams. However, the Ruiz '546 patent does not have a bar clamp, and also does not have a spring-loaded trigger.

Furthermore, U.S. Pat. No. 6,929,253 to Marks discloses a quick action bar clamp with improved stiffness and release button that binds a bar using wedges. However, the Marks '253 patent does not have a spike, and further lacks a safety cover.

U.S. Pat. No. 4,874,155 to Goul discloses a fast clamp that achieves faster operation through the entire clamping cycle. However, the Goul '155 patent does not have a spike, and has the additional deficiency of lacking a safety cover.

In addition, U.S. Pat. No. D320,919 to Sorensen discloses a quick action bar clamp that is an ornamental design for a quick action bar clamp. However, the Sorensen '919 patent does not have a spike, and also does not have a safety cover.

Furthermore, U.S. Pat. No. 5,853,168 to Drake discloses a bar clamp for single-hand operation that is an improved bar clamp. However, the Drake '168 patent does not have a spike, and further lacks a safety cover.

Lastly, U.S. Pat. No. 5,022,137 to Sorenson et al. discloses a method of operating a quick-action bar clamp that temporarily clamps together two articles. However, the Sorenson et al. '137 patent does not have a spike, and has the additional deficiency of lacking a safety cover.

While the above-described devices fulfill their respective, particular objectives and requirements, the aforementioned patents do not describe an oyster splitting device that allows splitting open oysters and clams.

Therefore, a need exists for a new and improved oyster splitting device that can be used for splitting open oysters and clams. In this regard, the present invention substantially fulfills this need. In this respect, the oyster splitting device according to the present invention substantially departs from the conventional concepts and designs of the prior art, and in doing so provides an apparatus primarily developed for the purpose of splitting open oysters and clams.

SUMMARY OF THE INVENTION

In view of the foregoing disadvantages inherent in the known types of bivalve openers now present in the prior art, the present invention provides an improved oyster splitting device, and overcomes the above-mentioned disadvantages and drawbacks of the prior art. As such, the general purpose of the present invention, which will be described subsequently in greater detail, is to provide a new and improved oyster splitting device which has all the advantages of the prior art mentioned heretofore and many novel features that result in a oyster splitting device which is not anticipated, rendered obvious, suggested, or even implied by the prior art, either alone or in any combination thereof.

To attain this, the present invention essentially comprises a drawbar with a jaw attached to one end, a grip slidably mounted on its middle, and a stop attached to its other end. A spring-loaded jaw trigger and a bar release trigger each have one of their opposing ends pivotably attached to the grip. A spike has one end removably attached to the grip and its opposing end facing the jaw.

There has thus been outlined, rather broadly, the more important features of the invention in order that the detailed description thereof that follows may be better understood and in order that the present contribution to the art may be better appreciated.

The invention may also include the spike being threadedly attached to the grip. A safety cover may removably cover one of the opposing ends of the drawbar opposite the jaw. There may be a lanyard with one end attached to the safety cover and its opposing end attached to the grip. The oyster splitting device may be about 12½ inches long, 6½ inches tall, and 1 inch wide when opened to its fullest extent. The drawbar, the stop, and the spike may be made of metal or heavy-duty plastic. The jaw trigger, the bar release trigger, the grip, and the jaw may be made of heavy-duty plastic, metal, or wood. Responsive to the jaw trigger being pulled, the drawbar may pull the jaw towards the spike. Responsive to the bar release trigger being pulled and held, the drawbar may be released so that the jaw can be pulled away from the spike until the safety cover contacts the grip. The drawbar may be slidably inserted through the grip. Responsive to the safety cover contacting the grip, the bar release trigger may be released to reset the jaw trigger. The invention may be a method for splitting oysters comprising the steps of: obtaining an oyster splitting device comprising a drawbar having opposing ends and a middle, a jaw having opposing sides with one of its opposing sides attached to one of the opposing ends of the drawbar, a grip slidably mounted on the middle of the drawbar, a stop attached to one of the opposing ends of the drawbar opposite the jaw, a spring-loaded jaw trigger with one end pivotably attached to the grip, a bar release trigger with one end pivotably attached to the grip, a spike with one end removably attached to the grip and its opposing end facing the jaw, a safety cover removably covering one of the opposing ends of the drawbar opposite the jaw, and a lanyard with one end connected to the safety cover and its opposing end end connected to the grip; obtaining an oyster having an open end and a hinged end by prying said oyster from a rock using the opposing end of the drawbar opposite the jaw with said safety cover removed, subsequently replacing the safety cover; placing the open end of the oyster against the jaw so that the hinged end faces the spike; splitting the hinged end of the oyster by pulling the jaw trigger to cause the jaw to urge the hinged end of the oyster against the spike; pulling and holding the bar release trigger; pulling the jaw away from the spike until the safety cover contacts the grip; removing the oyster from the oyster splitting device; and using the opposing end of the drawbar opposite the jaw with the safety cover removed to remove meat from the oyster, subsequently replacing the safety cover. There are, of course, additional features of the invention that will be described hereinafter and which will form the subject matter of the claims attached.

Numerous objects, features, and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved oyster splitting device that has all of the advantages of the prior art bivalve openers and none of the disadvantages.

It is another object of the present invention to provide a new and improved oyster splitting device that may be easily and efficiently manufactured and marketed.

An even further object of the present invention is to provide a new and improved oyster splitting device that has a low cost of manufacture with regard to both materials and labor, and which accordingly is then susceptible of low prices of sale to the consuming public, thereby making such oyster splitting device economically available to the buying public.

Still another object of the present invention is to provide a new oyster splitting device that provides in the apparatuses and methods of the prior art some of the advantages thereof, while simultaneously overcoming some of the disadvantages normally associated therewith.

Even still another object of the present invention is to provide an oyster splitting device for splitting open oysters and clams. This allows the user to open a wide variety of bivalves.

Still yet another object of the present invention is to provide an oyster splitting device for splitting open oysters and clams. This makes it possible to safely open a bivalve.

An additional object of the present invention is to provide an oyster splitting device for splitting open oysters and clams. This speeds the opening of a bivalve.

A further object of the present invention is to provide an oyster splitting device for splitting open oysters and clams. This facilitates the extraction of meat from a bivalve.

Lastly, it is an object of the present invention to provide a new and improved oyster splitting device for splitting open oysters and clams.

These together with other objects of the invention, along with the various features of novelty that characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there is illustrated current embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE CURRENT EMBODIMENT

Figure 1:
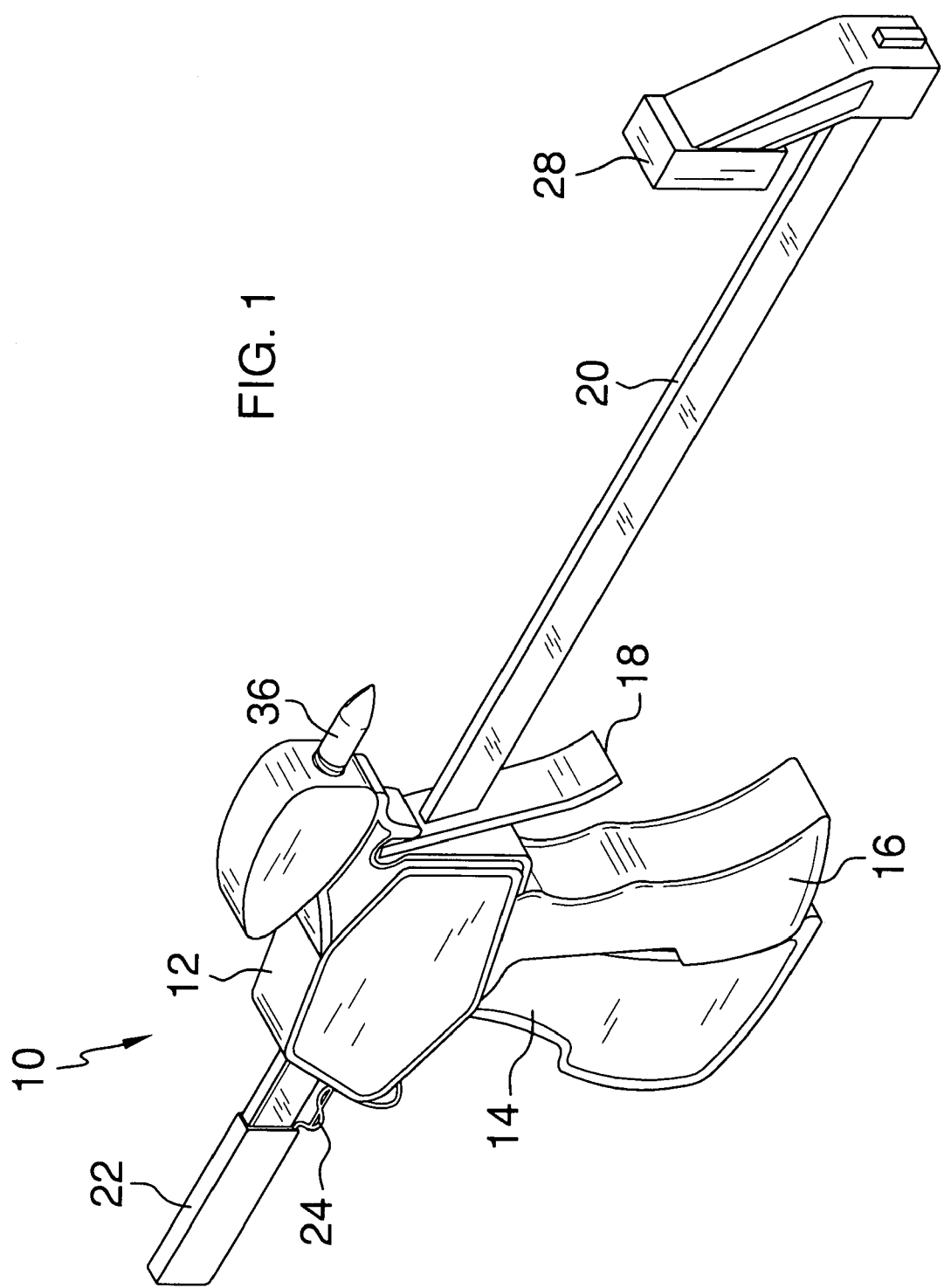
FIG. 1 is a top perspective view of the current embodiment of the oyster splitting device constructed in accordance with the principles of the present invention.

Referring now to the drawings, and particularly to FIGS. 1-4, a current embodiment of the oyster splitting device of the present invention is shown and generally designated by the reference numeral 10.

In FIG. 1, a new and improved oyster splitting device 10 of the present invention for splitting open oysters and clams is illustrated and will be described. More particularly, the oyster splitting device 10 has a bar clamp 12 consisting of a jaw 28 mounted on one end of a drawbar 20, a grip 14 slidably mounted on the middle of drawbar 20, and a safety cover 22 removably covering the other end of drawbar 20 opposite jaw 28. Safety cover 22 is connected to grip 14 by lanyard 24. Grip 14 has a spring-loaded jaw trigger 16 and a bar release trigger 18 with one end pivotably attached to it. Spike 36 has one end removably and threadedly connected to grip 14 with the opposing end of spike 36 facing jaw 28. The function of these objects will be explained subsequently. In the current embodiment, oyster splitting device 10 is about 12½ inches long, about 6½ inches tall, and 1 inch wide in the current embodiment when open to its fullest extent. Spike 36 can be unscrewed so that spike 36 can be cleaned easily, sharpened, or replaced if it becomes chipped or otherwise damaged. In the current embodiment, jaw 28, grip 14, jaw trigger 16, safety cover 22, and bar release trigger 18 are made of heavy-duty plastic, and drawbar 20 and spike 36 are made of metal. The end of drawbar 20 covered by safety cover 22 is tempered for extra strength and tapered. The tempered end of drawbar 20 can be used to pry oyster 30 loose from rocks to which it is attached, and the tempered end of drawbar 20 can also be used to remove meat from oyster 30 once spike 36 has split its shells.

Figure 2:
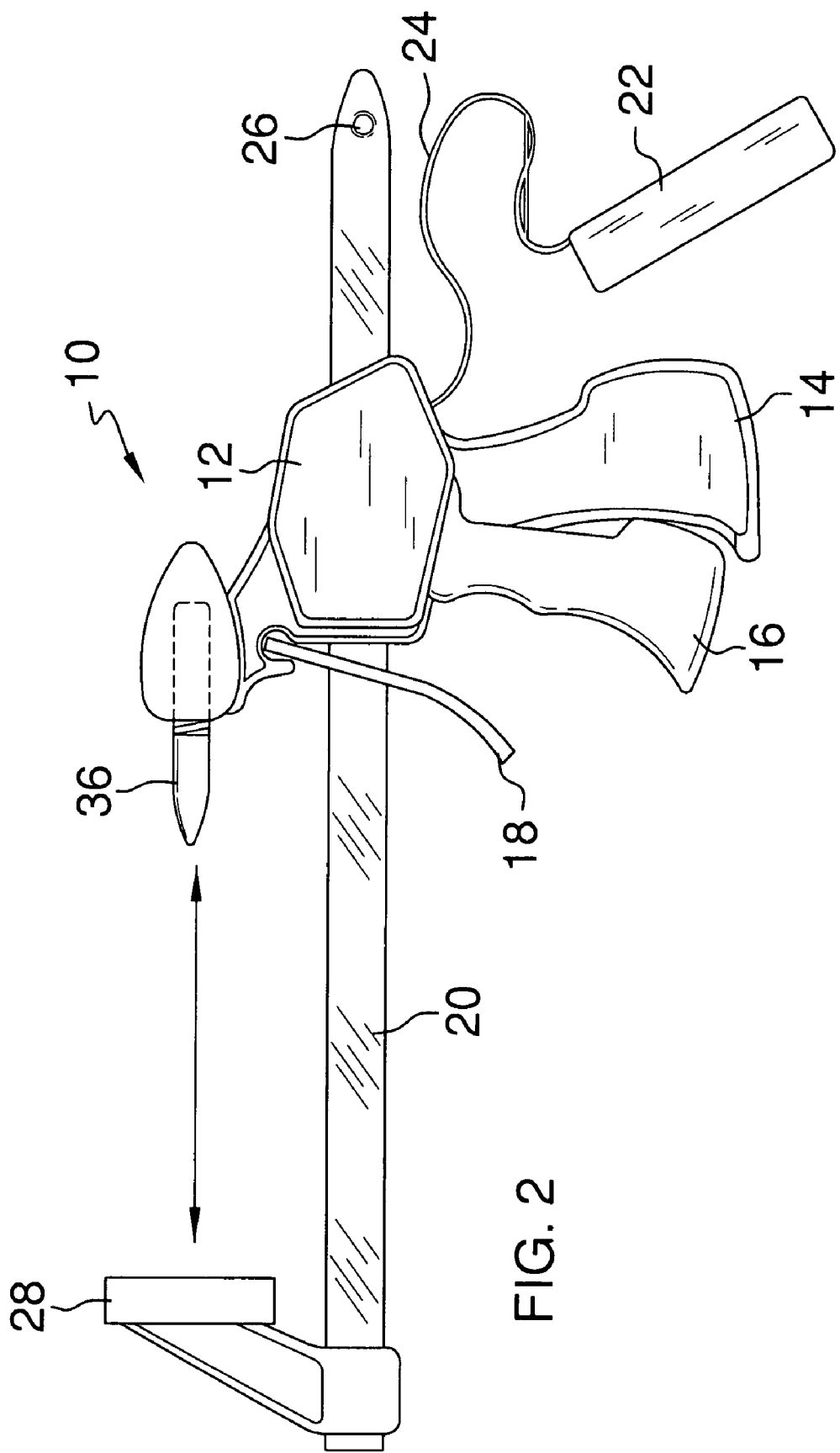
FIG. 2 is a side view of the oyster splitting device of the present invention.

Moving on to FIG. 2, a new and improved oyster splitting device 10 of the present invention for splitting open oysters and clams is illustrated and will be described. More particularly, the oyster splitting device 10 is depicted partially opened with safety cover 22 removed so that stop 26 is visible. Lanyard 24 prevent safety cover 22 from being lost when it is removed from drawbar 20. Stop 26 prevents drawbar 20 from being removed from grip 14. The double headed arrow denotes how oyster splitting device 10 functions when the user pulls jaw trigger 16 and bar release trigger 18. When the user pulls jaw trigger 16, a spring (not shown) within grip 14 pulls drawbar 20 through grip 14, which in turn pulls jaw 28 towards spike 36. To return oyster splitting device 10 to its fullest opened extent, the user pulls and holds bar release trigger 18. This releases drawbar 20, enabling the user to pull jaw 28 away from spike 36 until safety cover 22 reaches the rear of grip 14. The spring within grip 14 is also tensioned. When safety cover 22 reaches the rear of grip 14, the user releases bar release trigger 18 to reset jaw trigger 16. The oyster splitting device 10 is then ready for reuse. In the current embodiment, stop 26 is made of metal.

Figure 3:
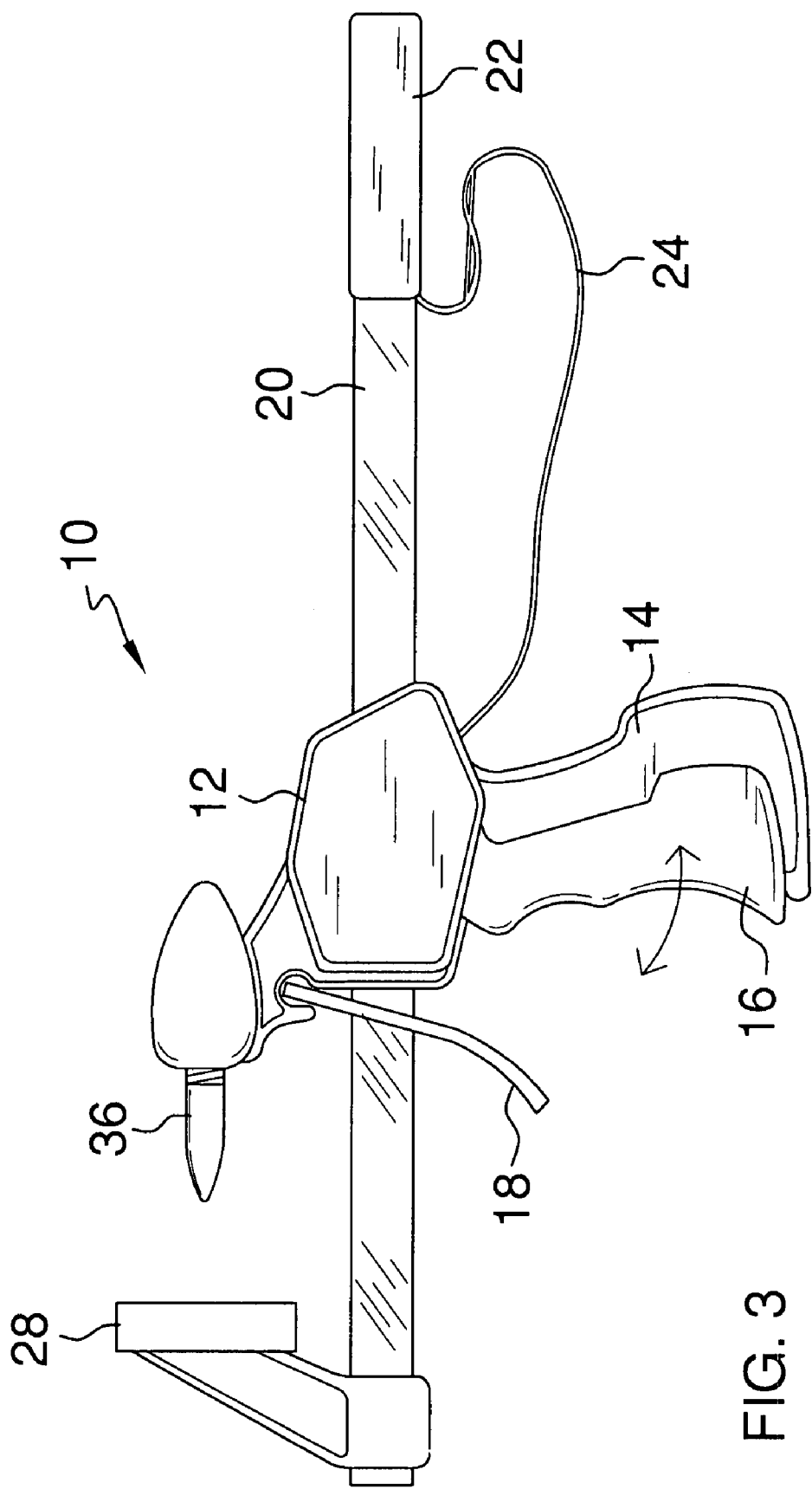
FIG. 3 is a side view of the oyster splitting device of the present invention.

Continuing with FIG. 3, a new and improved oyster splitting device 10 of the present invention for splitting open oysters and clams is illustrated and will be described. More particularly, the oyster splitting device 10 is depicted closed to its fullest extent with jaw 28 in close proximity to spike 36.

Figure 4:
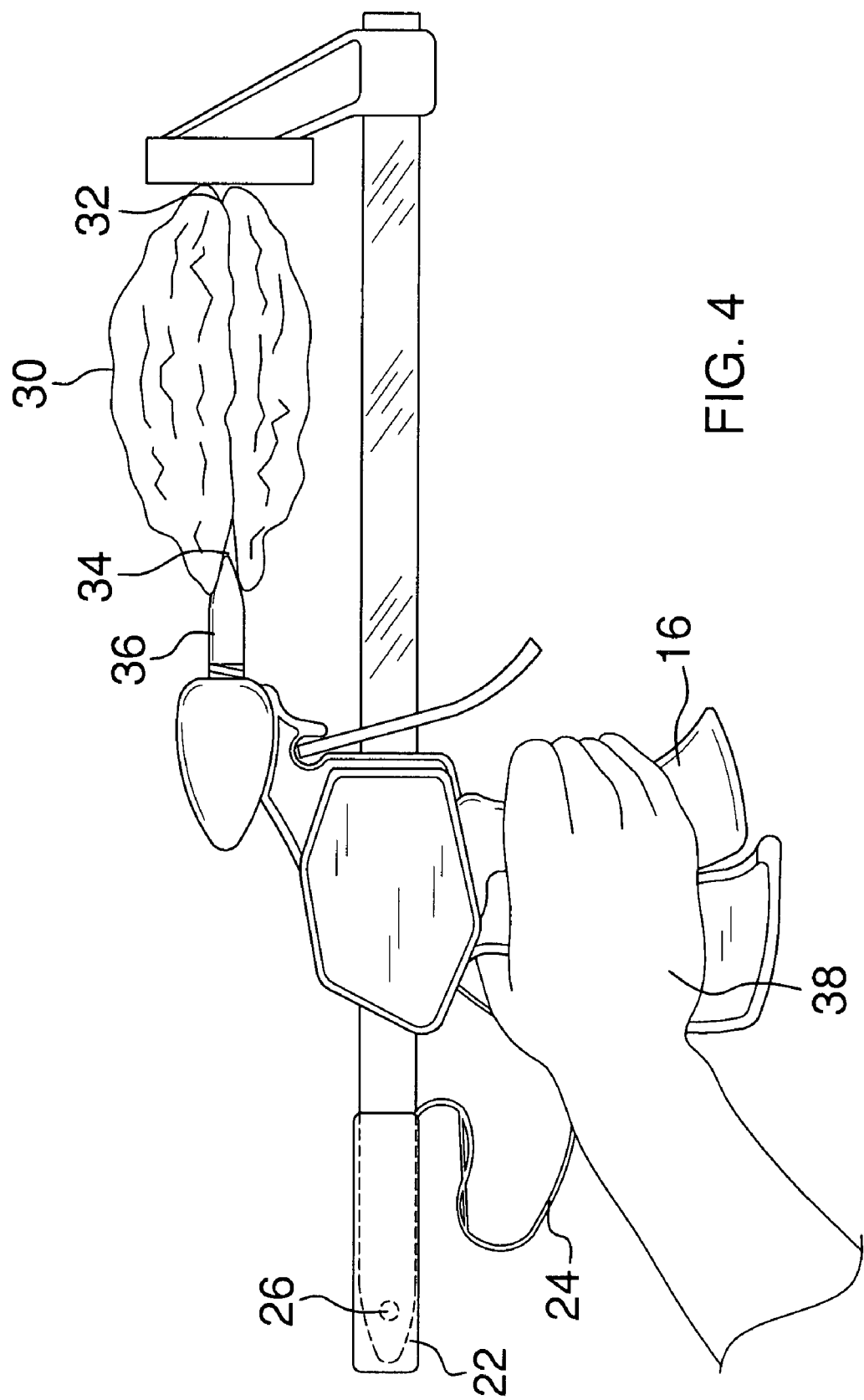
FIG. 4 is a side view of the oyster splitting device of the present invention.

Concluding with FIG. 4, a new and improved oyster splitting device 10 of the present invention for splitting open oysters and clams is illustrated and will be described. More particularly, the oyster splitting device 10 is shown in use with the user's hand 38 gripping grip 14 and jaw trigger 16. An oyster 30 has been placed between jaw 28 and spike 36 with its open end 32 against jaw 28 and its hinged end 34 facing spike 36. When the user pulled jaw trigger 16, the movement of drawbar 20 caused jaw 28 to urge oyster 30 against spike 36. Spike 36 pierced hinged end 34 of oyster 30, splitting the shells apart.

In use, it can now be understood that the user obtains an oyster 30, optionally removing safety cover 22 and employing the tempered end of drawbar 20 to pry the oyster 30 loose. After obtaining an oyster 30, the user positions it with its open end 32 against jaw 28 with its hinged end 34 facing spike 36. The user then pulls jaw trigger 16 so that drawbar 20 will caused jaw 28 to urge the hinged end 34 of oyster 30 against spike 36, thereby splitting oyster 30's shells. The user then pulls and holds bar release trigger 18 so that he or she can pull jaw 28 away from spike 36 to reset the oyster splitting device and remove oyster 30 from bar clamp 12. If desired, the user can utilize the tempered end of drawbar 20 to remove meat from oyster 30.

While a current embodiment of the oyster splitting device has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal or a variety of wood may be used instead of the heavy-duty plastic grip, jaw, jaw trigger, and bar release trigger described. Also, the metal spike, drawbar, and stop may also be made of heavy-duty plastic. And although splitting open oysters and clams has been described, it should be appreciated that the oyster splitting device herein described is also suitable for splitting open any type of bivalve mollusk. Furthermore, a wide variety of spike attachment methods may be used instead of the threads described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An oyster splitting device comprising:
   a drawbar having opposing ends and a middle;
   a jaw having opposing sides with one of said opposing sides attached to one of said opposing ends of said drawbar;
   a grip slidably mounted on said middle of said drawbar;
   a stop attached to one of said opposing ends of said drawbar opposite said jaw;
   a spring-loaded jaw trigger having opposing ends with one end pivotably attached to said grip;
   a bar release trigger having opposing ends with one end pivotably attached to said grip;
   a spike having opposing ends with one end removably attached to said grip and said opposing end facing said jaw; and
   a lanyard having opposing ends with one end attached to said safety cover and said opposing end attached to said grip.

2. An oyster splitting device comprising:
   a grip;
   a drawbar having opposing ends, wherein said drawbar is slidably inserted through said grip;
   a jaw having opposing sides with one of said opposing sides attached to one of said opposing ends of said drawbar;
   a stop attached to one of said opposing ends of said drawbar opposite said jaw;
   a spring-loaded jaw trigger having opposing ends with one end pivotably attached to said grip;
   a bar release trigger having opposing ends with one end pivotably attached to said grip;
   a spike having opposing ends with one end removably attached to said grip and said opposing end facing said jaw; and
   a lanyard having opposing ends with one end attached to said safety cover and said opposing end attached to said grip.

3. A method for splitting oysters comprising the steps of:
   obtaining an oyster splitting device comprising:
   a drawbar having opposing ends and a middle;
   a jaw having opposing sides with one of said opposing sides attached to one of said opposing ends of said drawbar;
   a grip slidably mounted on said middle of said drawbar;
   a stop attached to one of said opposing ends of said drawbar opposite said jaw;
   a spring-loaded jaw trigger having opposing ends with one end pivotably attached to said grip;
   a bar release trigger having opposing ends with one end pivotably attached to said grip;

a spike having opposing ends with one end removably attached to said grip and said opposing end facing said jaw;

a safety cover removably covering one of said opposing ends of said drawbar opposite said jaw; and a lanyard having opposing ends with one end connected to said safety cover and said opposing end connected to said grip;

obtaining an oyster having an open end and a hinged end by prying said oyster from a rock using said opposing end of said drawbar opposite said jaw with said safety cover removed, subsequently replacing said safety cover;

placing said open end of said oyster against said jaw so that said hinged end faces said spike;

splitting said hinged end of said oyster by pulling said jaw trigger to cause said jaw to urge said hinged end of said oyster against said spike;

pulling and holding said bar release trigger;

pulling said jaw away from said oyster splitting implement until said safety cover contacts said grip;

removing said oyster from said oyster splitting device; and using said opposing end of said drawbar opposite said jaw to remove meat from said oyster, subsequently replacing said safety cover.

\* \* \* \* \*